United States Patent
Mutchnik et al.

(10) Patent No.: US 8,989,330 B2
(45) Date of Patent: Mar. 24, 2015

(54) METHOD AND APPARATUS TO DETECT A SYNCHRONIZATION DELIMITER

(75) Inventors: Sharon D. Mutchnik, San Jose, CA (US); Moshe Gat, Santa Clara, CA (US)

(73) Assignee: Silicon Laboratories Inc., Austin, TX (US)

( * ) Notice: Subject to any disclaimer, the term of this patent is extended or adjusted under 35 U.S.C. 154(b) by 1089 days.

(21) Appl. No.: 12/847,677

(22) Filed: Jul. 30, 2010

(65) Prior Publication Data

US 2012/0027149 A1 Feb. 2, 2012

(51) Int. Cl.
*H04L 7/00* (2006.01)
*H04L 7/04* (2006.01)

(52) U.S. Cl.
CPC ........................... *H04L 7/042* (2013.01)
USPC ..................... 375/365; 375/354; 375/366

(58) Field of Classification Search
USPC ................................. 375/365–370
See application file for complete search history.

(56) References Cited

U.S. PATENT DOCUMENTS

| | | | | |
|---|---|---|---|---|
| 5,490,155 A | * | 2/1996 | Abdoo et al. | 714/763 |
| 5,500,876 A | * | 3/1996 | Nagata | 375/332 |
| 5,550,833 A | * | 8/1996 | Fujisawa | 370/514 |
| 2001/0046232 A1 | * | 11/2001 | Takagi et al. | 370/392 |

* cited by examiner

*Primary Examiner* — Vineeta Panwalkar
*Assistant Examiner* — Janice Tieu
(74) *Attorney, Agent, or Firm* — Trop, Pruner & Hu, P.C.

(57) ABSTRACT

A technique includes receiving a datum indicative of a candidate delimiter in a receiver; and processing the datum in a machine to determine whether the datum indicates a synchronization delimiter. The processing includes comparing the candidate delimiter with a reference delimiter to identify at least one error in the candidate delimiter; and basing the determination of whether the datum indicates the synchronization delimiter at least on a bit position of of each error.

23 Claims, 3 Drawing Sheets

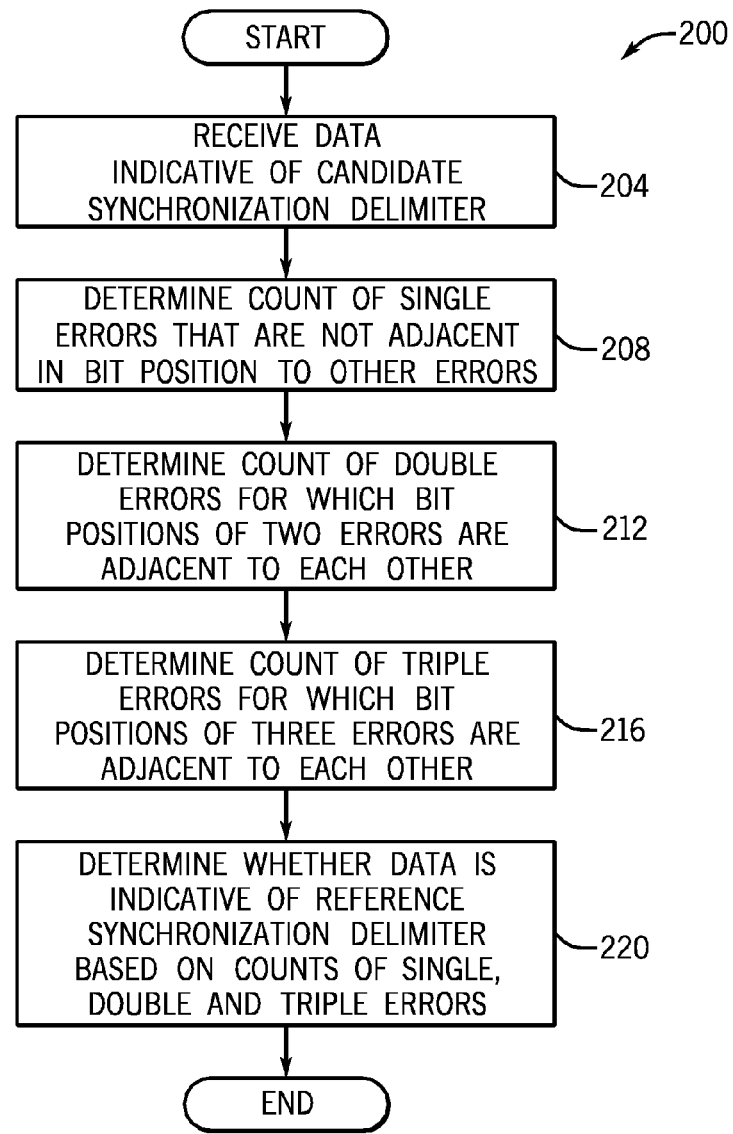
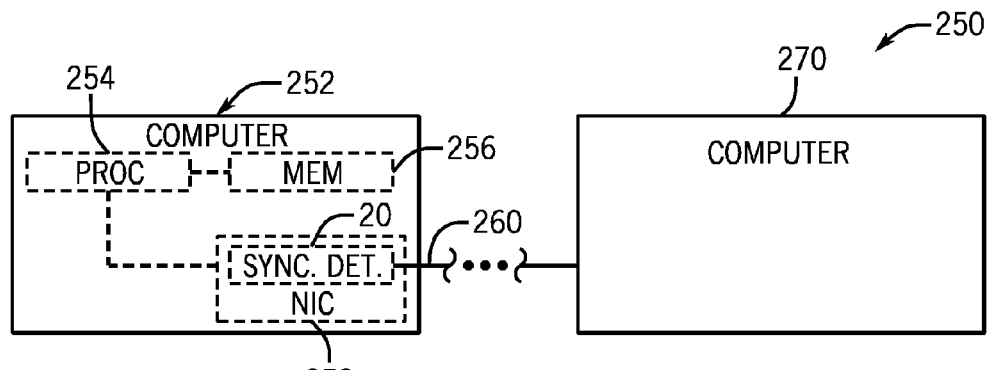

METHOD AND APPARATUS TO DETECT A SYNCHRONIZATION DELIMITER

BACKGROUND

The disclosure generally relates to a method and apparatus to detect a synchronization delimiter.

A typical wireless communication system communicates data in units, such as packets. For purposes of allowing a receiver to recognize the beginning of a given packet, a reference synchronization delimiter, often called a "syncword," typically precedes the other data of the packet in the packet's transmission. Therefore, upon recognizing a syncword in an incoming data stream, the receiver processes the data that proceeds the syncword to acquire meaningful and correct information about the associated packet.

Wireless data communications are often subject to interference, which may introduce some degree of data loss and errors in the packet data. To protect the transmitted data and allow the recovery of otherwise lost data, the packet data may, in general, be encoded pursuant to various data encoding schemes (Hamming Distance, Reed-Salomon or Viterbi encoding schemes, for example). The syncword, however, typically is not protected or encoded due to its role as being the leading identifier for the associated packet.

SUMMARY

In an exemplary embodiment, a technique includes receiving a datum indicative of a candidate delimiter in a receiver; and processing the datum to determine whether the datum indicates a synchronization delimiter. The processing includes comparing the candidate delimiter with a reference delimiter to identify at least one error in the candidate delimiter; and basing the determination of whether the datum indicates the synchronization delimiter at least on a bit position of each error.

In another exemplary embodiment, an apparatus includes a memory and a synchronization detector. The memory receives a datum indicative of a candidate delimiter; and the synchronization detector determines whether the datum indicates the synchronization delimiter based at least in part on a bit position of each error in the candidate delimiter.

In another exemplary embodiment, a method includes receiving a datum indicative of a candidate delimiter and potentially indicative of a synchronization delimiter for a packet in a receiver; and processing the datum to compare the candidate delimiter to a reference delimiter to identify a count of errors in the candidate delimiter which have adjacent bit positions.

In yet another exemplary embodiment, an apparatus includes a memory and an error detector. The memory receives a datum, which is indicative of a candidate delimiter and is potentially indicative of a synchronization delimiter for a packet. The error detector is coupled to the memory to compare the candidate delimiter to a reference delimiter to identify a count of errors in the candidate delimiter which have adjacent bit positions.

Advantages and other features of the invention will become apparent from the following drawing, description and claims.

BRIEF DESCRIPTION OF THE DRAWING

FIGS. 2 and 4 are flow diagrams depicting techniques to detect a synchronization delimiter according to exemplary embodiments.

FIG. 5 is a schematic diagram of a communication system that uses wired communication according to an exemplary embodiment.

DETAILED DESCRIPTION

Figure 1:
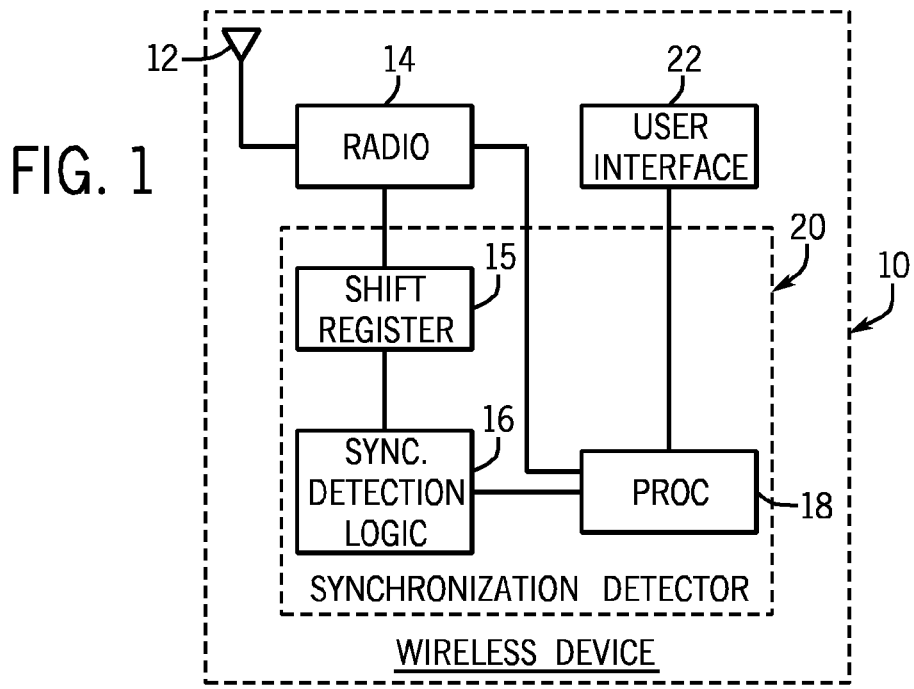
FIG. 1 is a schematic diagram of a wireless device according to an exemplary embodiment.

Referring to FIG. 1, in accordance with exemplary embodiments disclosed herein, a wireless device 10 (a personal digital assistant (PDA), a Bluetooth transceiver, a cellular telephone, a smartphone, a Wi-Fi transceiver, and so forth) includes a radio 14 with an antenna 12 that receives a signal that is indicative of wirelessly communicated data. To identify the beginning of a given unit of data, such as a packet, the wireless device 10 monitors an incoming bit stream to identify a synchronization delimiter, which is called "syncword." The syncword is a predefined sequence of bits, such as a predefined sequence of thirty-two bits, for example, which is expected to precede the unit of data. It is noted that although the term "syncword" is used in the following description, the techniques and systems that are disclosed herein are not limited to detecting synchronization delimiters that are words or multiple of words. After the wireless device 10 identifies, or detects, the syncword, the device 10 may thereafter begin processing the data that proceeds the syncword in the bit stream. As an example, this proceeding data may be header and payload data of a corresponding packet.

For purposes of detecting the syncword, the wireless device 10 includes a synchronization detector 20, which includes a shift register 15 that allows the detector 20 to monitor a window of incoming data and synchronization detection logic 16 that generate signals that, as described below, may be used to determine whether syncword has been detected. In this manner, the wireless device 10 receives an incoming serial bit stream of data; and the incoming data momentarily accumulates in the shift register 15, with the register 15 storing a new bit and forcing out the oldest stored bit in the register 15 as each bit is received by the device 10. As an example, the wireless device 10 may begin slicing and processing the incoming bit stream associated with a given packet in response to the synchronization detector 20 detecting a syncword associated with that packet.

The wireless device 10, in general, may be any type of device that wirelessly receives an incoming bit stream that employs the use of synchronization delimiters to identify units of data. The wireless device 10 may include components other than the synchronization detector 20, radio 14 and antenna 12, such as a user interface 22 (a display, keypad and associated circuitry), antennas and radios for other bands, a transmitter (Bluetooth or low power FM transmitter, as examples), digital signal processor (DSP), etc.

One potential way for the wireless device 10 to detect a syncword is for the device 10 to determine whether a candidate syncword exactly matches an expected, or reference syncword. To the extent that the candidate and reference syncwords do not exactly match, the candidate syncword contains one or more errors. In this manner, the "candidate syncword" is formed from the current contents of the shift register 15 and may or may not be the expected syncword. As a non-limiting example, the reference syncword may be a thirty-two bit word, which is formed from bits that arranged in a predetermined sequence of ones and zeros, such as the following: 0101000011110101001110011101001. Furthermore, continuing the example, at a given time, the bits in the shift register 15, which form a given candidate syncword may be as follows: 0101000011000101001110011101001. For this example, the candidate and reference syncwords do not exactly match, as bit numbers (starting with bit number one at the rightmost position) twenty one and twenty-two are different; and therefore, for this example, the candidate syncword contains two errors at bit positions twenty-one and twenty-two.

The above-described exact match technique for detecting syncwords may fail to recognize syncwords that have been subject to momentary interference during their transmissions, as the momentary interference may have corrupted one or more bits in the version of the syncword, which is received by the wireless device 10. Another scheme for detecting the syncword may involve tolerating some number of errors in the candidate syncword. However, this scheme may incorrectly identify a pattern of bits as a syncword.

In accordance with exemplary embodiments, which are disclosed herein, the synchronization detector 20 considers the relative bit positions of the errors in the candidate syncword for purposes of determining whether a syncword has been detected. This scheme for detecting syncwords recognizes that the syncword may be subject to a momentary interference, such as Gaussian white noise, for example, during the syncword's transmission, which disrupts two or more adjacent bits of the syncword. Therefore, the syncword detection scheme that is disclosed herein recognizes that errors that have adjacent bit positions may be attributable to such a momentary interference and treats such adjacent errors as a single error.

For the example above, the candidate syncword (0101000011000101001110011101001) and reference syncword (0101000011101010011100111101001) differ at bit positions twenty-one and twenty-two. Because the bit positions of the errors are adjacent to each other, the synchronization detector 20 considers these adjacent errors as a single error when determining whether a syncword has been detected.

Figure 2:
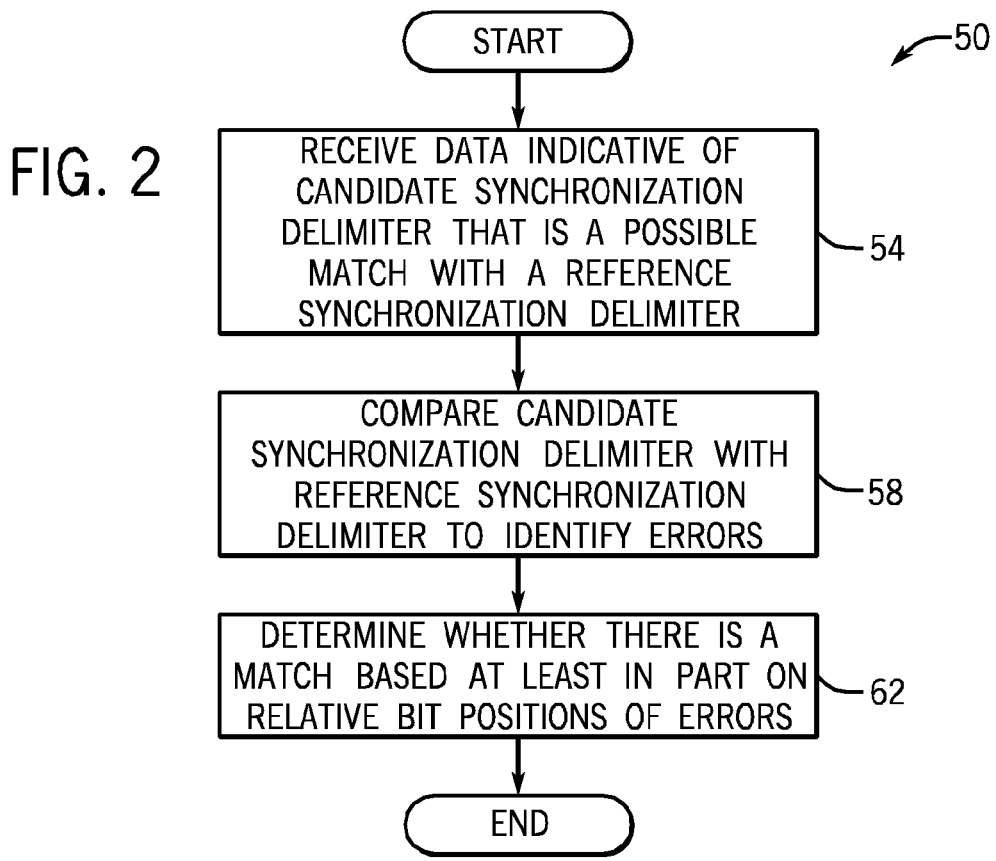

To summarize, referring to FIG. 2 in conjunction with FIG. 1, in accordance with exemplary embodiments disclosed herein, the synchronization detector 20 performs a technique 50 to detect a syncword. Pursuant to the technique 50, the synchronization detector 20 receives (block 54) data, or a datum, which is indicative of a candidate synchronization delimiter that is a possible match with a reference synchronization delimiter. The synchronization detector 20 compares (block 58) the candidate synchronization delimiter with the reference synchronization delimiter to identify differences between these delimiters, which denotes errors in the candidate synchronization delimiter; and the synchronization detector 20 determines (block 62) whether there is a match based at least in part on the relative bit positions of the errors.

Two, three or more of the errors may have adjacent bit positions; and depending on the particular embodiment, the synchronization detector 20 may treat each group of adjacent errors as being a single error. In the context of the application, a "double error," or "double adjacent error," refers to a pattern of errors in which two of the errors are adjacent; a "triple error," or "triple adjacent error," refers to a pattern of errors in which three of the errors are adjacent; a "quadruple error," or "quadruple adjacent error," refers to a pattern of errors in which four of the errors are adjacent; etc.

In some embodiments, the synchronization detector 20 may treat double adjacent errors as single errors and not treat any other adjacent errors as single errors; in other embodiments, the synchronization detector 20 may treat both double and triple adjacent errors as single errors and not treat any other adjacent errors as single errors; in yet other embodiments, the synchronization detector 20 may treat double, triple and quadruple adjacent errors as single errors and not treat any other adjacent errors as single errors; etc.

Moreover, the synchronization detector 20 may employ an upper threshold error count as a benchmark for determining whether the syncword has been detected. Depending on the particular embodiment, the upper threshold error count may be one, two or three errors (treating each adjacent group of errors as a single error); may be a weighted combination of the number of detected single errors, double adjacent errors, triple adjacent errors, etc.; or may be some variation thereof.

Referring to FIG. 1, turning now to more specific features of the synchronization detector 20, in accordance with some embodiments, the synchronization detection logic 16 is an error identifier that compares the data that is stored in the shift register 15 with an expected, or reference, syncword to generate an error detection result that indicates the number and bit position(s) of the detected error(s) in the candidate syncword. For example, in accordance with some embodiments, the synchronization detection logic 16 generates an ordered bitwise error identifier in which bits of the identifier indicate the bit position(s) of any detected errors. As a non-limiting example, the bitwise error identifier may be a string of bits of the same size as the reference/candidate syncword; and the bits of the bitwise error indicator have zero values (herein called "zero bits") to indicate bit matches for the corresponding bit positions of the reference/candidate syncword and one values (herein called "one bits") to indicate mismatches, or errors, for the corresponding bit positions. Thus, if the bitwise error identifier has contains all zeros, the candidate and reference syncwords exactly match.

For the specific example that is set forth above, the bitwise error identifier is as follows: 0000000000110000000000000000000. For this example, the one bits indicate that adjacent errors in the candidate syncword have been detected at bit positions twenty-one and twenty-two, i.e., this is an example of a double adjacent error.

In accordance with some embodiments, in addition to the generation of the bitwise error indicator, the synchronization detection logic 16 also provides signals that indicate the counts of the detected instances of single, double adjacent and triple adjacent errors. Thus, the synchronization detection logic 16, in general, provides signals that indicate an error detection result, which is indicative of the comparison between the synchronization and reference syncwords; and this error detection result may include the error counts and/or the bitwise error identifier, depending on the particular embodiment.

Among its other features, in accordance with some embodiments, the synchronization detector 20 may include a processor 18 for purposes of evaluating the error detection result that is provided by the synchronization logic 16 to determine whether the syncword has been detected. Depending on the particular embodiment, the processor 18 may be a dedicated processor to make this determination; or the processor 18 may be used for various other purposes in the wireless device 10, such as receiving input from the user interface 22, performing baseband signal processing, controlling the overall operation of the wireless device 10, etc.

In other embodiments, circuitry other than a processor, such as a hard wired machined (a programmed logic array, as a non-limiting example), may evaluate the error detection result provided by the synchronization detector 20 for purposes of determining whether the syncword has been detected.

In accordance with some embodiments, the shift register 15 and synchronization detection logic 16 may be fabricated on the same monolithic semiconductor die and may be part of the same semiconductor package, although these components may be located on different dies and/or in different semiconductor packages, in accordance with other embodiments. As another example, in accordance with other embodiments, all of the circuit components of the wireless device 10 may be fabricated on the same monolithic die, may be fabricated on more than one die inside the same semiconductor package, may be part of separate semiconductor packages, may be part of a multi-chip module (MCM), etc. Thus, many variations are contemplated and are within the scope of the appended claims.

Figure 3:
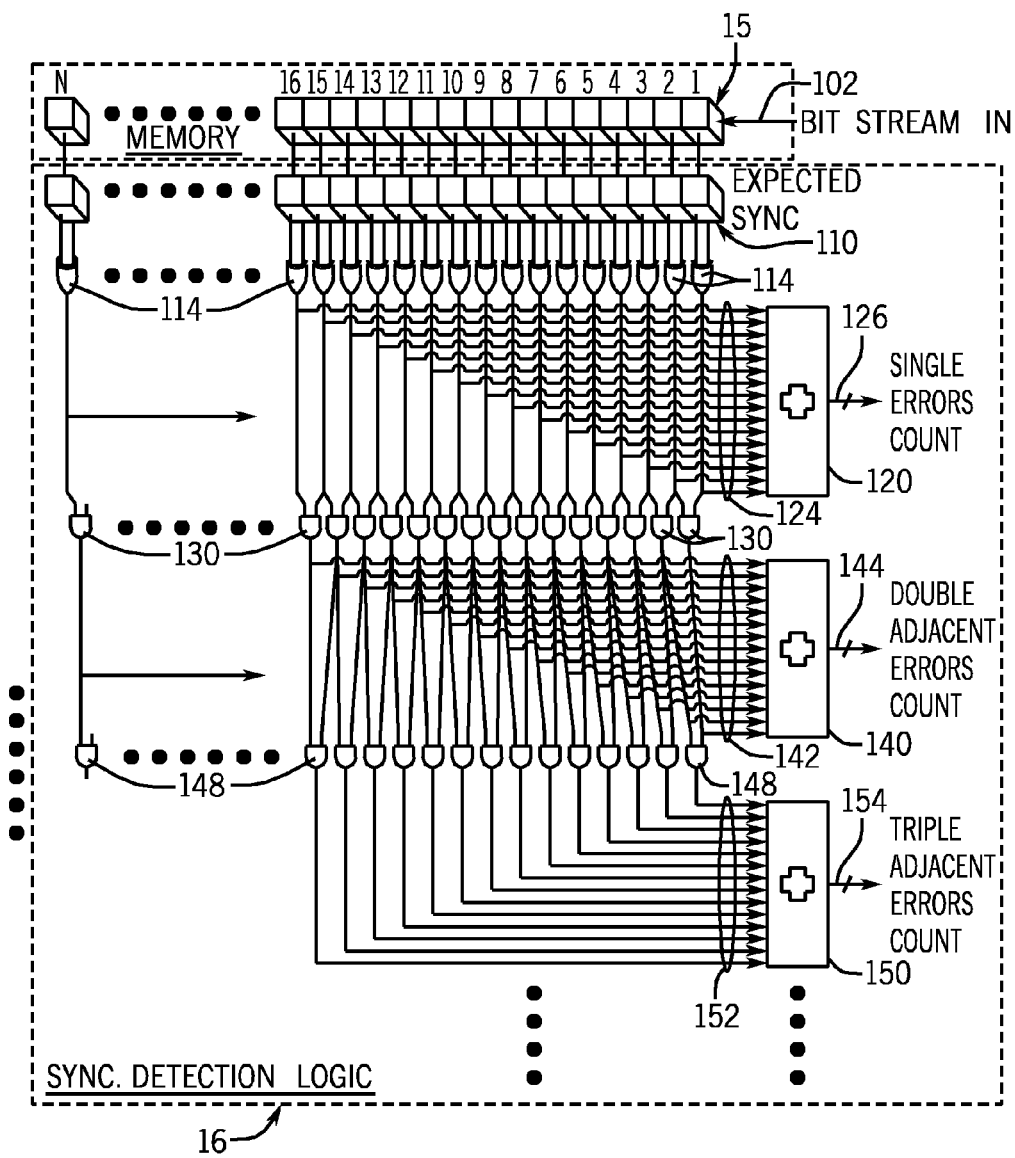
FIG. 3 is a schematic diagram of synchronization detection logic and a shift register of the wireless device of FIG. 1 according to an exemplary embodiment.

Referring to FIG. 3, in accordance with some embodiments, the synchronization detection logic 16 includes an N bit register 110 that stores the N-bit expected, or reference syncword. For this example, the shift register 15 stores the N-bit candidate syncword, with bit number one being coupled to an input line 102 to receive the latest incoming bit. In addition to the register 110, the synchronization detection logic 16 includes exclusive OR (XOR) gates 114, for purposes of generating an ordered N-bit, bitwise error indicator. In this regard, similar to the example set forth above, each zero bit of the bitwise error indicator indicates that the corresponding bits of the registers 15 and 110 are the same; and each one bit of the bitwise error indicator indicates that the corresponding bits of the registers 15 and 110 have different values.

As depicted in FIG. 3, each XOR gate 114 is associated with a different particular bit position: the XOR gate 114 compares a particular bit of the shift register 15 with a corresponding bit of the register 110. In other words, one input terminal of the XOR gate 114 is coupled to a particular bit of the shift register 15, and another input terminal of the XOR gate 114 is coupled to the corresponding bit of the register 110. Thus, the output terminals of the XOR gates 114 collectively provide the bitwise error indicator.

To provide an indication of the number of detected single errors, the synchronization logic 16 includes a counter 120. The input terminals 124 of the counter 120 are coupled to the output terminals of the XOR gates 114 for purposes of adding together the number of single errors that are indicated by the bitwise error indicator. The counter 120 has output terminals 126, which provide signals that indicate the single error count.

For purposes of providing an indication of the number of detected double adjacent errors, the synchronization logic 16 includes a counter 140 and additional circuitry to detect the double adjacent errors. In this regard, in accordance with some embodiments, the synchronization detection logic 16 includes AND gates 130. The input terminals of each AND gate 130 are coupled to output terminals of two different XOR gates 114 that, in turn, are associated with adjacent bit positions. Thus, the output terminal of each AND gate 130 provides a signal that is indicative of whether the AND gate 130 has detected two adjacent errors in the bitwise error indicator. The counter 140 to count the number of double adjacent errors has input terminals 142 that are coupled to the output terminals of the AND gates 130. The counter 140 has output terminals 144, which provide signals that indicate the number of double adjacent errors.

Depending on the particular embodiment, the synchronization detection logic 16 may include additional logic and counters for indicating a different number of adjacent errors. For example, in accordance with some embodiments, the synchronization detection logic 16 includes AND gates 148. Each AND gate 148 has its input terminals coupled to two output terminals of the AND gates 130; and the output terminal of each AND gate 148 indicates whether a particular triple adjacent error has been detected. The synchronization detection logic 16 includes a counter 150 that has input terminals 152 that are coupled to the output terminals of the AND gates 148 for purposes of counting the number of triple adjacent errors. This count is indicated by the counter 150 at its output terminals 154.

Thus, to summarize, in accordance with some embodiments, a technique 200 that is depicted in FIG. 4 may be used for purposes of detecting a syncword. The technique 200 may be performed by circuitry such as the synchronization detector 20, in accordance with some embodiments. Referring to FIG. 4, pursuant to the technique 200, data, or a datum, indicative of a candidate synchronization delimiter is received (block 204) and a count of single errors is determined, pursuant to block 208. The technique 200 further includes determining (block 212) a count of the number of double adjacent errors, in which bit positions of two errors are adjacent to each other; and determining (block 216) a count of the number of triple adjacent errors for which positions of three errors are adjacent to each other. A determination is then made, pursuant to block 220, whether the data is indicative of the reference synchronization delimiter (and thus, whether the syncword has been detected) based on counts of the single, double and triple errors. Thus, as a non-limiting example, the synchronization detector 20 may be programmed to deem that a syncword has been detected when a combined number of single errors, double adjacent errors, triple adjacent errors, etc. are less than a predetermined upper error count threshold. As mentioned above, the synchronization detector 20 may alternatively base the detection on a weighted combination of these errors.

Other embodiments are contemplated and are within the scope of the appended claims. For example, although a wireless device is disclosed herein, it is contemplated that the techniques and systems that are disclosed herein may likewise be applied to wired communication systems. For example, FIG. 5 depicts a communication system 250 that employs some degree of wired communications, in accordance with some embodiments. These wired communications may experience momentary interferences, such as momentary interferences that are attributable to cross channel interference, for example. The techniques and systems that are disclosed herein may likewise be applied for purposes of detecting synchronization delimiters in these wired communications.

For this example, the communication system 250 includes computers 252 and 270, which communicates data with each other over a communication link 260. The communication link 260 may employ wired communication, such as cable-based communication (wired Ethernet communication, for example) over at least part of the link 260, as a non-limiting example. The computer 252 includes a network interface card (NIC) 258 that is coupled to the communication link 260 and includes the synchronization detector 20. As also depicted in FIG. 5, the computer 252 may include various other elements, such as a processor 254 (one or more central processing units (CPUs) or processing cores, for example), a system memory 256, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving a datum indicative of a candidate delimiter in a receiver; and
processing the datum to determine whether the datum indicates a synchronization delimiter, the processing comprising:
comparing the candidate delimiter with a reference delimiter to identify at least one error in the candidate delimiter; and
basing the determination of whether the datum indicates the synchronization delimiter at least on a bit position of each error of said at least one error.

2. The method of claim 1, wherein said at least one error comprises a plurality of errors, and the processing further comprises further basing the determination of whether the datum indicates the synchronization delimiter at least on the bit positions of the plurality of errors relative to each other.

3. The method of claim 1, wherein said at least one error comprises a plurality of errors, and the processing the datum further comprises:
determining whether at least some of the bit positions are adjacent to each other.

4. The method of claim 1, wherein said at least one error comprises a plurality of errors, and the act of processing the datum further comprises:
determining a count of instances for which three of the errors have bit positions that are adjacent to each other; and
further basing the determination of whether the datum indicates the synchronization delimiter on the count.

5. The method of claim 1, wherein said at least one error comprises a plurality of errors and processing the datum further comprises:
determining a first count of instances for which two of the errors have bit positions that are adjacent to each other; and
further basing the determination of whether the datum indicates the synchronization delimiter on the first count.

6. The method of claim 5, wherein processing the datum further comprises:
determining a second count of instances for which three of the errors have bit positions that are adjacent to each other; and
further basing the determination of whether the datum indicate the synchronization delimiter on the first and second counts.

7. The method of claim 6, wherein processing the datum further comprises:
determining a third count of errors that have bit positions that are not adjacent to any of the other bit positions; and
further basing the determination of whether the datum indicates the synchronization delimiter on the number of first, second and third counts.

8. The method of claim 1, wherein the synchronization delimiter comprises a syncword.

9. The method of claim 1, wherein receiving the datum comprises wirelessly receiving the datum.

10. An apparatus comprising:
a memory to receive a datum indicative of a candidate delimiter; and
a synchronization detector to determine whether the datum indicates a synchronization delimiter based at least in part on a bit position of each error of at least one error in the candidate delimiter.

11. The apparatus of claim 10, wherein said at least one error comprises a plurality of errors, and the synchronization detector further bases the determination of whether the datum indicates the synchronization delimiter at least on the bit positions of the plurality of errors relative to each other.

12. The apparatus of claim 10, wherein the memory comprises a shift register.

13. The apparatus of claim 10, wherein said at least one error comprises a plurality of errors and the synchronization detector comprises:
synchronization logic to detect the errors and provide an indication of a count of errors that are associated with adjacent bit positions.

14. The apparatus of claim 10, wherein the memory and the synchronization detector are included in a wireless device.

15. The apparatus of claim 10, wherein said at least one error comprises a plurality of errors and the synchronization detector is further adapted to determine whether the datum indicates the synchronization delimiter based on a count of instances for which two of the errors have bit positions that are adjacent to each other.

16. The apparatus of claim 10, wherein said at least one error comprises a plurality of errors and the synchronization detector is further adapted to determine whether the datum indicates the synchronization delimiter based on a count of instances for which three of the errors have bit positions that are adjacent to each other.

17. A method comprising:
receiving datum indicative of a candidate delimiter and potentially indicative of a synchronization delimiter for a packet in a receiver; and
processing the datum to compare the candidate delimiter to a reference delimiter to identify a count of errors in the candidate delimiter which have adjacent bit positions.

18. The method of claim 17, wherein the count comprises a count of instances for which two of the errors have bit positions that are adjacent to each other.

19. The method of claim 17, wherein the count comprises a count of instances for which three of the errors have bit positions that are adjacent to each other.

20. An apparatus comprising:
a memory to receive a datum indicative of a candidate delimiter and being potentially indicative of a synchronization delimiter for a packet; and
an error detector coupled to the memory to compare the candidate delimiter to a reference delimiter to identify a count of errors in the candidate delimiter which have adjacent bit positions.

21. The apparatus of claim 20, wherein the memory and the error detector are part of a wireless device.

22. The apparatus of claim 20, wherein the count comprises a count of instances for which two of the errors have bit positions that are adjacent to each other.

23. The apparatus of claim 20, wherein the count comprises a count of instances for which three of the errors have bit positions that are adjacent to each other.

* * * * *